(12) United States Patent
Smith

(10) Patent No.: US 7,320,572 B2
(45) Date of Patent: Jan. 22, 2008

(54) CARGO UNLOADING APPARATUS AND METHOD

(76) Inventor: Fred P. Smith, 228 S. Scenic Dr., Alpine, UT (US) 84004

( * ) Notice: Subject to any disclaimer, the term of this patent is extended or adjusted under 35 U.S.C. 154(b) by 312 days.

(21) Appl. No.: 10/760,648

(22) Filed: Jan. 20, 2004

(65) Prior Publication Data
US 2004/0178671 A1  Sep. 16, 2004

Related U.S. Application Data

(60) Provisional application No. 60/441,490, filed on Jan. 21, 2003.

(51) Int. Cl.
*B60P 1/00* (2006.01)

(52) U.S. Cl. ................. 414/527; 414/437; 414/813

(58) Field of Classification Search ............. 414/437, 414/507, 527, 529, 813
See application file for complete search history.

(56) References Cited

U.S. PATENT DOCUMENTS

| | | | | |
|---|---|---|---|---|
| 49,006 A | | 7/1865 | Stevens | 414/527 |
| 360,493 A | | 4/1887 | Wagner | 414/510 |
| 1,015,074 A | * | 1/1912 | Rice | 414/402 |
| 2,808,159 A | | 10/1957 | Beltran Simo | 214/83.34 |
| 2,958,432 A | * | 11/1960 | Milhem | 414/529 |
| 3,900,118 A | * | 8/1975 | Kellogg | 414/530 |
| 3,978,996 A | * | 9/1976 | Oltrogge | 414/527 |
| 4,212,581 A | * | 7/1980 | Pierce | 414/529 |
| 4,629,390 A | | 12/1986 | Burke | 414/527 |
| 5,156,518 A | * | 10/1992 | VanMatre | 414/527 |
| 5,184,931 A | * | 2/1993 | Safko | 414/522 |
| 5,340,266 A | | 8/1994 | Hodgetts | 414/527 |
| 5,564,891 A | * | 10/1996 | Podd et al. | 414/812 |
| 5,624,223 A | | 4/1997 | Lovato | 414/480 |
| 5,915,911 A | * | 6/1999 | Hodgetts | 414/527 |
| 6,059,371 A | | 5/2000 | Smith et al. | 298/1 A |
| 6,131,983 A | | 10/2000 | Jackson | 296/39.2 |
| 6,267,448 B1 | | 7/2001 | Hendry et al. | 298/22 |

* cited by examiner

*Primary Examiner*—James Keenan
(74) *Attorney, Agent, or Firm*—Pate Pierce & Baird

(57) ABSTRACT

An apparatus and method to facilitate unloading material from the cargo area (e.g. bed) of a vehicle. The apparatus may include a flexible member placed to line the bottom of the cargo area before a load is placed therein. After moving the vehicle to a desired location, a friction-reducing member may be placed to extend across the rear edge of the cargo area (e.g. the rear edge of an open tailgate). One end of the flexible member may be wrapped around the friction-reducing member and placed just behind the rear wheels of the vehicle. The vehicle may then be moved in reverse. The wheels of the vehicle roll over the flexible material, fixing one end thereof to the ground. The friction reducing member acts like a pulley (whether rolling with, or simply sliding with respect to, the flexible member) at the edge of the moving tailgate, drawing the flexible member and associated load out of the cargo area of the vehicle.

8 Claims, 5 Drawing Sheets

CARGO UNLOADING APPARATUS AND METHOD

RELATED APPLICATIONS

This application claims the benefit of U.S. Provisional Patent Application Ser. No. 60/441,490 filed on Jan. 21, 2003 and entitle CARGO UNLOADER.

BACKGROUND

1. The Field of the Invention

This invention relates to cargo transporting and, more particularly, to novel systems and methods for unloading material from a cargo area.

2. The Background Art

Many materials such as sand, gravel, dirt, and grain are commonly transported in pickup trucks, trailers, and the like. Other bulk materials commonly transported include trash, yard waste, manure, mulch, bark, building materials, hay, feed, firewood, equipment, tools, palletized materials, and the like. These materials are generally loaded in bulk at a distribution point by a front-end loader, overhead bin, forklift, or the like. Thus, loading of the material into the cargo area of a vehicle is generally accomplished without much effort.

The same does not hold true, however, for unloading the materials from vehicles. Unloading usually takes place at a jobsite, the vehicle owner's home or yard, or other place where unloading must be accomplished by physical labor. Generally, this means using a shovel to unload granular or other bulk materials or physically manhandling equipment type items from the front of the cargo area where they are generally placed for the best load distribution, to the rear of the cargo area where they may be off-loaded. Unloading in this manner is labor intensive, time consuming, and dangerous due to the manual labor involved and the requirement that the unloader climb on top of the load.

One method employed to solve these problems is to tilt the cargo area up at an angle utilizing gravity to off-load the material such as shown in the inventor's patent U.S. Pat. No. 6,267,448. Many such apparatus require major modifications to the vehicle. Those that use a hydraulic cylinder to do the dumping have required the bed to be raised destroying the cab to body lines and the looks of the truck. Even the hinge system in the inventor's U.S. Pat. No. 6,059,371 may be expensive and require modifications to the vehicle to hinge the cargo area or truck bed to allow the load to be dumped.

Another method that has been used to remove a load from the cargo area is shown in U.S. Pat. No. 49,006. This method utilizes a jointed conveyor of slats that is narrower than the width of the cargo area. The conveyor is pulled out by winding a cord attached at the front of the conveyor slats around a roller at the rear of the cargo area. Often, such designs require that the roller be rotated by a hand crank.

Another variation is shown in U.S. Pat. No. 5,340,266. In this patent, a flexible material is pulled out of the bed as it wraps around a roller that is rotated by a manually driven crank. Others have replaced the manual crank with a motor drive system such as shown in U.S. Pat. No. 4,629,390. Another method is shown in U.S. Pat. No. 6,131,983, wherein a liner is fitted to the bed of a truck and includes pockets for the wheel wells and straps on the front that may be pulled rearward by hand to roll the load out onto the ground.

Each of the foregoing devices is either costly to manufacture, manually powered, limited in maximum capacity, dependent on extensive modifications to the vehicle, or the like. What is needed is a inexpensive system that is easy to operate and requires little or no modification to the vehicle.

BRIEF SUMMARY OF THE INVENTION

In view of the foregoing, in accordance with the invention as embodied and broadly described herein, a method and apparatus are disclosed in one embodiment of the present invention as including cargo unloader. A cargo unloader in accordance with the present invention will be explained as installed and used on a pickup truck. However, it is to be understood that the invention may be applied equally well to a trailer, a flatbed truck, car, or any number of other vehicles.

The present invention utilizes a flexible member. In certain embodiment, the flexible member may be wider than the distance from the inside of one rear wheel to the inside of the opposite wheel. The flexible member may have a length that is approximately twice the length of the cargo area. In one embodiment, the flexible member is approximately two feet wider than the width from outside of one tire to outside of the opposite tire. The present invention may utilize a friction-reducing member position near the rearward most end of an open tailgate.

A flexible member in accordance with the present invention may be placed in the bottom of the cargo area. One portion (i.e. the first portion) of the flexible member may be positioned to cover a portion or all of the cargo area. The extra length (i.e. the second portion) of the flexible member may be positioned proximate the rear of the cargo area. The cargo area may then be loaded by any of many typical methods such as by a front-end loader, chute, forklift, or manually.

The extra length of the flexible member at the rear of the cargo area may be unrolled back toward the front of the cargo area to cover the load. If desired, the flexible member may be secured (e.g. by bungee cords, rope, and the like) to keep the load from blowing out of the cargo area during transport.

Upon arrival at the destination where the load is to be placed, an operator may position the vehicle proximate the desired dumping site. In certain embodiment, the vehicle may be positioned about half the length of the cargo area in front of were the load is to be deposited. The operator may then open the tailgate. If desired, the friction-reducing member may be placed on the tip or rearward most edge of the tailgate.

A friction-reducing member in accordance with the present invention may comprise multiple pieces to facilitate storage. In certain embodiment, a friction-reducing member may comprise a "J" shaped plastic formed of polyethylenes, fluoropolymers, or other such materials with a low coefficients of friction with respect to the material of the flexible member. In selected embodiments, the friction-reducing member may be installed on the tailgate with the straight portion of the "J" parallel to the tailgate and the hook portion running around the rearward most edge of the tailgate.

The friction-reducing member in accordance with the present invention may accomplish several purposes. A friction-reducing member may reduce frictional forces and associated wear by facilitating movement of the flexible member around the tailgate. A friction-reducing member may protect the finish of the tailgate. A friction-reducing member may also extend side to side in a lateral direction a distance greater than the width of the tailgate. In certain embodiments, a friction-reducing member having a width greater than the tailgate may reduce stress concentrations at the corners of the tailgate that may otherwise rip flexible members made of selected materials.

With the tailgate open and the friction-reducing member in place, the operator may loose the second portion of the flexible member was secured over the load. In certain embodiments, removing the second portion may be accomplished by rolling. The second portion of the flexible member may then be positioned to extend out the rear of the cargo area, around the friction-reducing member, and be deposited just behind the rear tires of the vehicle. The operator may then back vehicle over the end of the second portion of the flexible material.

As the operator continues to back the vehicle, the tires and ground hold one end of the flexible material. As this occurs, the friction-reducing member may be pushed into the flexible member urging the remainder of the flexible member to slide out the rear of the cargo area. The load on top of the flexible member may move with the flexible member to the rear of the cargo area and over the edge of the tailgate. The load may thus be deposited onto the ground. When dumping is completed, the flexible material ends up on top of the deposited load. The vehicle may then be driven forward off of the flexible material. The flexible material may be folded and stored with the friction-reducing member for future use.

Accordingly, the present invention is a new and improved unloading device to unload a cargo area with minimal manual effort. The instant invention requires no modifications to the vehicle. Certain embodiments may be installed for use in less than one minute and may be taken off and stored out of sight in less than one minute. The present invention may be readily adaptable to all pickup trucks, trailers, cars, as well as many other types of vehicles. It may be noted that certain embodiments of the present invention automatically hold the tailgate down when in use. Thus, eliminating the need for other hold down straps required by manual crank unloaders. Furthermore, the present invention is inexpensive to manufacture. The present invention also provides for covering of the load during transit. Moreover, the present invention provides powered unloading with minimal manual labor.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 10, is not intended to limit the scope of the invention, as claimed, but is merely representative of selected embodiments of the invention.

Figure 1:
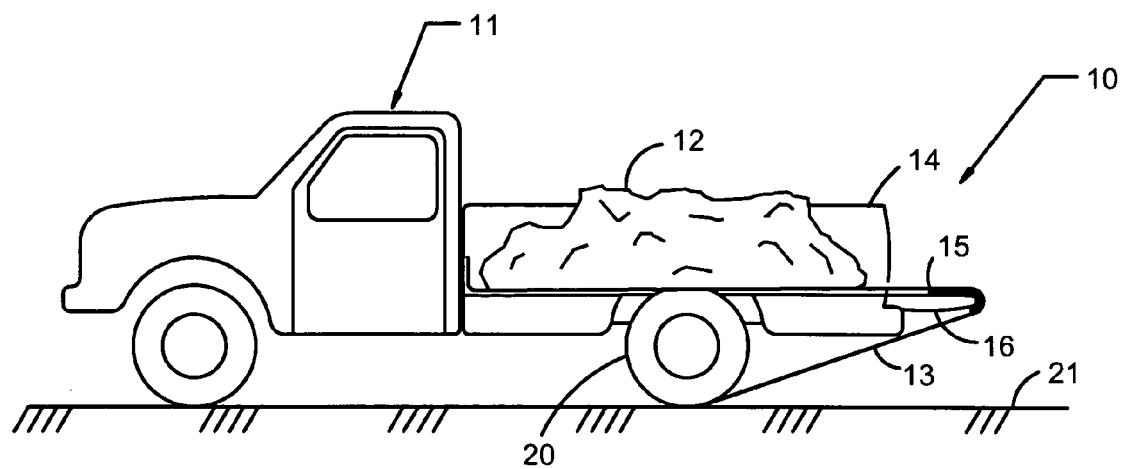
FIG. 1 is a partial cutaway, side elevation view of a pickup truck equipped with a flexible member and friction-reducing member in accordance with the present invention, the cargo area of the pickup truck is loaded with material and the flexible member is positioned to begin unloading.

Referring to FIG. 1, a cargo unloader 10 in accordance with the present invention may be applied to a vehicle 11. For illustrative purposes, a pickup truck 11 will be the vehicle 11 illustrated in the Figures. However, it is understood that the present invention maybe applied to any vehicle such as a flatbed truck, trailer, car, or any other type of load carrier.

Figure 2:
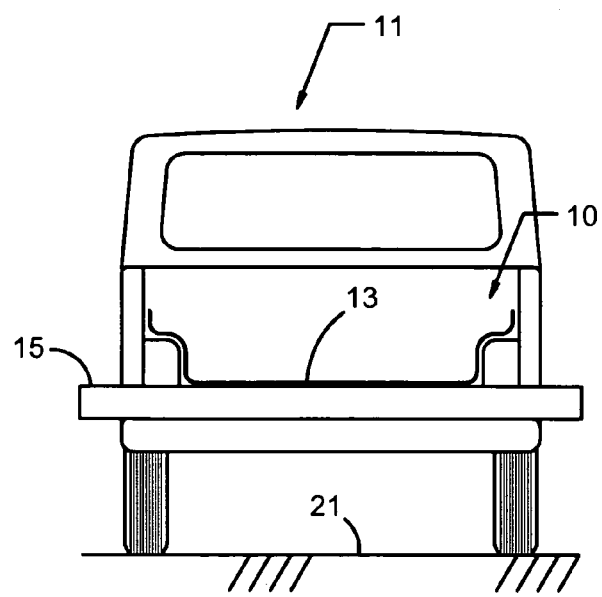
FIG. 2 is a rear elevation view of a pickup truck with a flexible member and friction-reducing member installed in accordance with the present invention.
Figure 3:
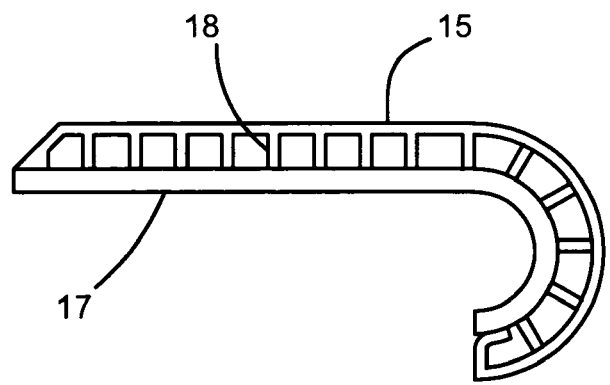
FIG. 3 is a cross-sectional view of one embodiment of a friction-reducing member in accordance with the present invention.

A flexible member 13 may be placed in the cargo area 14 of a vehicle 11. In certain embodiments, the flexible member 13 may be about one foot wider on each side than the cargo area 14. As shown in FIG. 2, the extra width of the flexible member 13 may allow at least a portion of the sides of a cargo area 14 to be covered by the flexible member 13. The extra width of a flexible member 13 assist in removing the entire load 12 from the cargo area. In certain embodiments, the extra width of a flexible member 13 may allow the tires 20 to consistently engage the flexible member 13 during extraction the load 12.

The material of the flexible member 13 may be chosen to minimize the coefficient of friction between the cargo area 14 and the flexible member 13. A flexible member 14 in accordance with the present invention may be formed of any suitable material. Suitable materials may include fibers, polymers, elastomers, woven fibers, composites, and the like. The material of the flexible member 13 may be selected to have sufficient strength and to resist tearing during the unloading process. In certain embodiments, to increase the strength of the flexible member 13, the edges of the flexible member 13 may be folded over one or more times. If desired, the overlap may be held in place with grommets, sewing, glue, heat, and the like. In certain embodiments, a reinforcement may attach to the flexible member 13.

In selected embodiments, a flexible member 13 in accordance with the present invention may be made of an elastic material that will resiliently and appreciably stretch under load. This may allow the inertia of the vehicle 11 to be used to generate a larger force to pull the load 12 from the cargo area 14 than may otherwise be available. This may assist in load transportation and removal using vehicles without a low gear ratio.

A friction-reducing member 15 may reduce the frictional forces of the flexible member 13 as the load 12 is extracted. A friction-reducing member in accordance with the present invention may be formed of any suitable material. Suitable materials may include woods, metals, metal alloys, polymers, elastomers, composites, and the like.

In selected embodiments, a friction-reducing member 15 may extend some distance greater than the width of the tailgate 16. This additional extension may accommodate the extra width of the flexible member 13 and reduce stress concentrations of the flexible member 13 at the corners of the tailgate 16. If desired, the friction-reducing member 15 may be positioned to protect the tailgate 16 from damage during the unloading process. In selected embodiments, the underside of the friction-reducing member 15 that rests against the tailgate 16 may have a soft lining 17. In one embodiment, the lining 17 may be rubber, or the like, applied with a pressure sensitive adhesive. In another embodiment, the lining 17 may be rubber, or the like, co-extruded with the rest friction-reducing member 15.

In certain embodiments, the end of the friction-reducing member 15 that faces the cargo area 14 may be beveled or rounded to facilitate movement of the flexible material 13 and load 12 over the friction-reducing member 15. In selected embodiments, a friction-reducing member 15 in accordance with the present invention may be formed by any known method such as thermoforming, injection molding, rotationally molding, or extrusion. In one embodiment, ribs 18 may be formed along the interior surface of the friction-reducing member to increase rigidity and strength.

Figure 4:
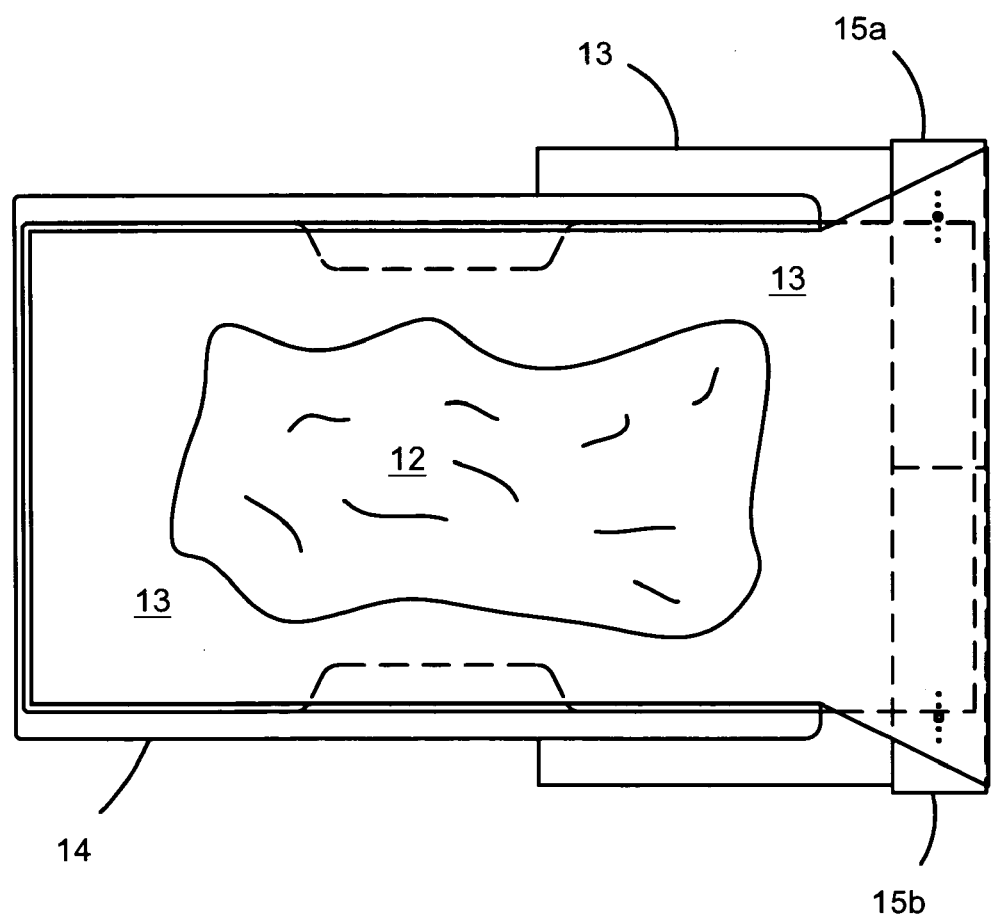
FIG. 4 is a plan view of the cargo area shown in FIG. 1.
Figure 5:
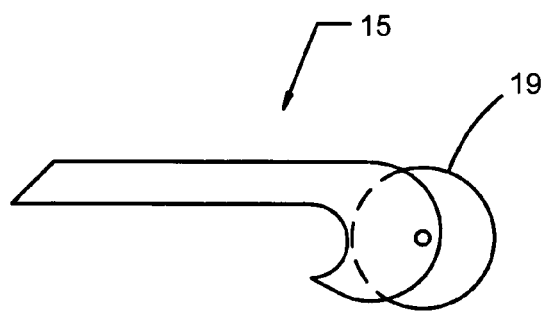
FIG. 5 is a cross-sectional view of an alternative embodiment of a friction-reducing member in accordance with the present invention.

As shown in FIG. 4, in other embodiments, a friction-reducing member 15 may be formed of two or more sections 15a and 15b. As shown in FIG. 5, in another alternative embodiment, a friction-reducing member 15 may incorporate one or more rollers 19 to facilitate motion of the flexible member 13 as it rounds the tailgate 16.

Figure 6:
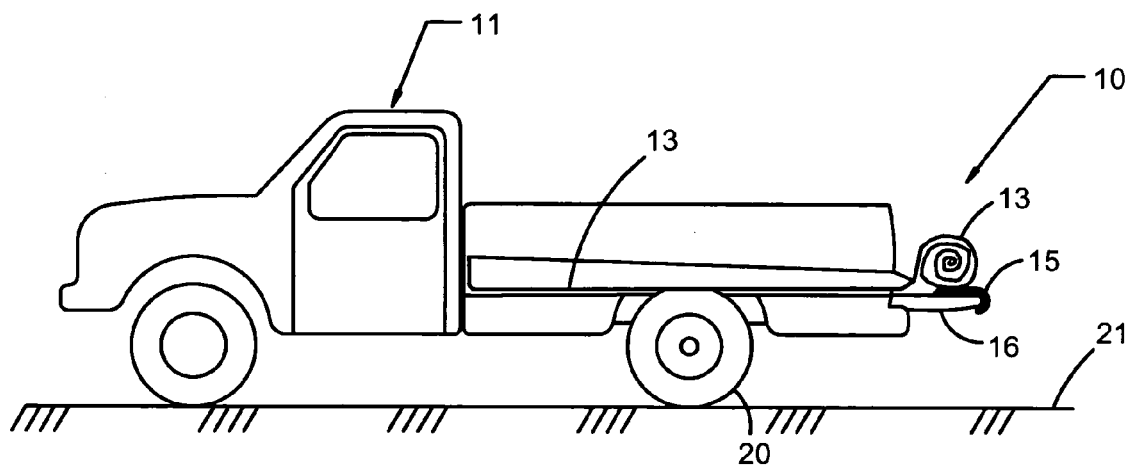
FIG. 6 is a partial cutaway, side elevation view of a pickup truck equipped with a flexible member and friction-reducing member in accordance with the present invention, the cargo area of the pickup truck being ready to receive a load of material.

As shown in FIG. 6, a cargo unloader 10 may be installed to receive a load 12. A flexible member 13 may be installed such that the sides extend some distance up the sides of the cargo area 14. The extra length or second portion of the flexible member 13 may remain rolled on the tailgate 16 or at the rear of the vehicle 11.

Figure 7:
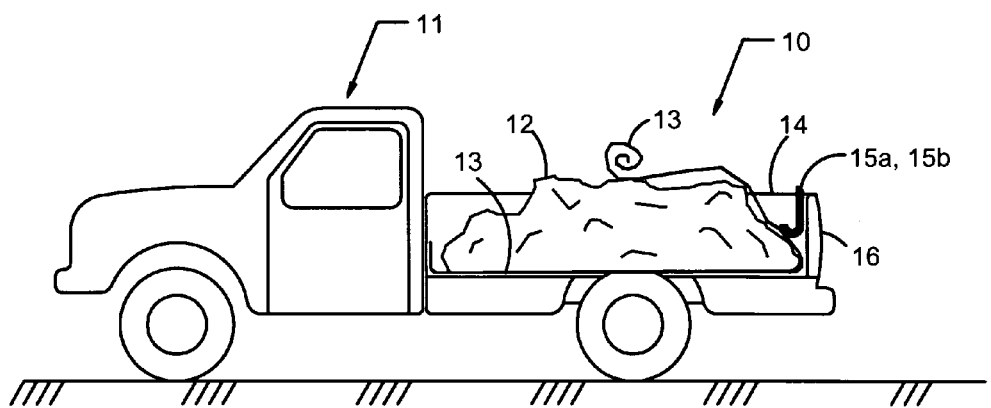
FIG. 7 is a partial cutaway, side elevation view of a pickup truck with a flexible member installed, and a friction-reducing member stowed, in accordance with the present invention, the cargo area of the pickup truck is loaded with material and the flexible member is being positioned to cover the load.

As shown in FIG. 7, a load 12 may be placed on the flexible member 13. The extra portion of the flexible member 13 may placed over the top of the load 12. If desired, after the load 12 is completely covered, the flexible member 13 may be secured with bungee cords, ropes, or the like. Such an arrangement may kept material from blowing out of the cargo area 14. If desired, the friction-reducing member 15 or members 15a and 15b may be placed inside the cargo area 14 for storage.

With the load 12 secured, the operator may transport the load 12 to the destination where the load 12 is to be dumped. In selected embodiments, to dump the load 12, the operator may position the vehicle 11 approximately the length of the cargo area 14 in front of where the load 12 is to be positioned. The vehicle 11 may be secure to prevent inadvertent movement. The operator may open the tailgate 16 and place the friction-reducing member 15 or members 15a and 15b over the edge or lip of the tailgate 16.

If the extra length of the flexible member 13 had been used as a cover for the load 12, the operator may takes off the bungee cords, ropes, etc. and roll the flexible member 13 toward and onto the tailgate 16. The extra length of the flexible member 13 may then be dropped to the ground 21 and positioned just behind the rear tires 20. The flexible member 13 may naturally have some slack in it as shown in FIG. 1.

During setup and operation, the friction-reducing member 15 may be held in place by the forces applied thereto by the flexible member 13. To begin dumping, the operator may back the vehicle 11 such that the rear wheels 20 roll onto the flexible member 13. As the vehicle 11 proceeds rearward, the vehicle 11 pushes the friction-reducing member 15 into the flexible member 13. The friction between the ground 21, the extra length (i.e. the second portion) of the flexible member 13, and tires 20 may hold the flexible member 13 fixed with respect to the ground 21. Because the friction-reducing member 13 is still being pushed into the flexible member 13, the portion of the flexible member 13 on top of the cargo area 14 (i.e. the first portion) must move rearward with respect to the cargo area 14. As the flexible member 13 moves rearward, the load 12 moves with it until it reaches the lip of the tailgate 16. At this point, the load 12 may drop onto the ground 21. As the vehicle 11 continues rearward, the load 12 continues to dump until the entire load 12 is emptied from the cargo area 14.

Upon completion of dumping, the flexible member 13 may be deposited on top of the load 12. The vehicle 11 may now be moved forward off of the flexible member 13. If desired, the flexible member 13 may now be folded or rolled up and stored in the cargo area 14 along with the friction-reducing member 15 or members 15a and 15b.

Figure 8:
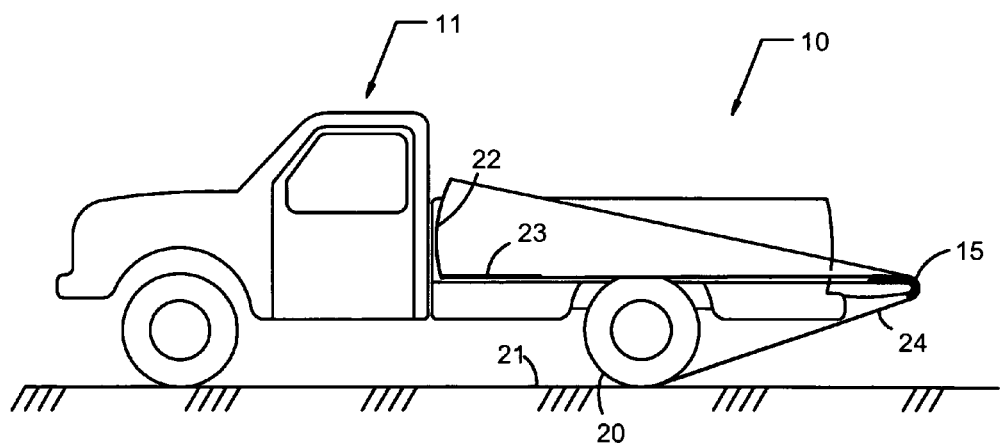
FIG. 8 is a partial cutaway, side elevation view of a pickup truck equipped with an alternative embodiment of a flexible member and friction-reducing member in accordance with the present invention.
Figure 9:
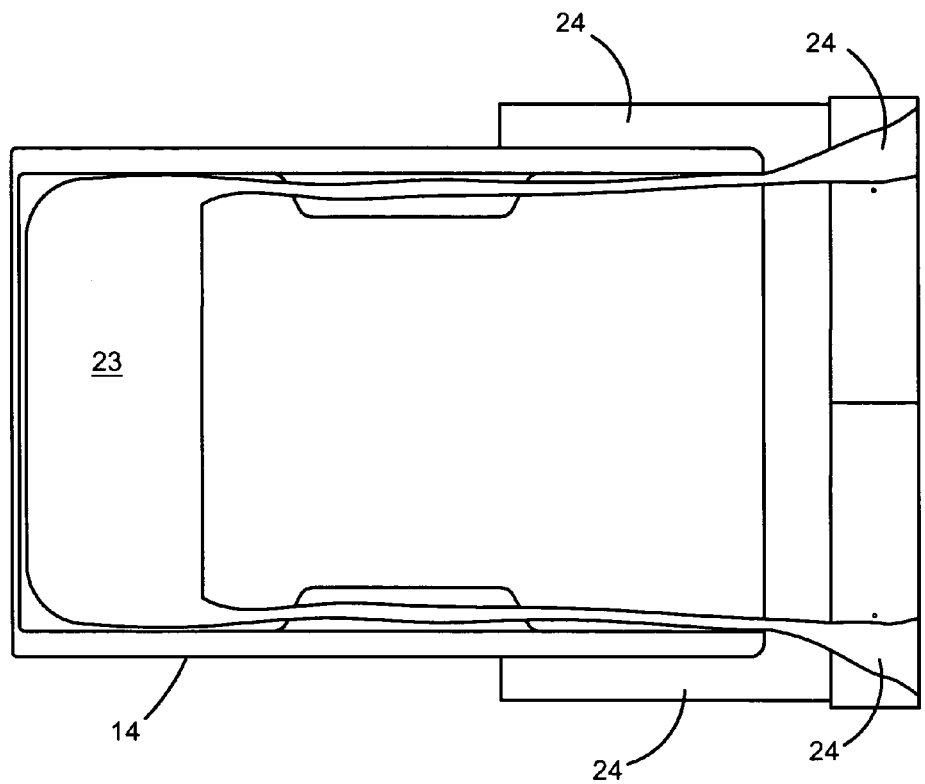
FIG. 9 is a plan view of the cargo area shown in FIG. 8.

An alternative embodiment of a flexible member 13 is shown in FIG. 8. In this embodiment, a pull piece 22 is positioned at the front of the load. In certain embodiment, the pull piece 22 may have a partial bottom 23 as best shown in FIG. 9. In this embodiment, extension pieces 24 may extend out of the cargo area 14, around the tailgate 16, to the tires 20 for unloading.

Conceptually, the embodiment shown in FIG. 8 and FIG. 9 unloads material form the cargo area 14 through a similar process as previously described for unloading. However, because the load 12 is pulled out by the pull piece 22 that does not extend entirely beneath the load 12, the frictional forces between the load 12 and the cargo area 14 must be overcome. Moreover, only the extension pieces 24 go under the tires 20. As the vehicle is reversed, the extension pieces 24 pull the pull piece 22 and partial bottom 23, if used, rearward along with anything that is between the pull piece 22 and the tailgate 16.

Figure 10:
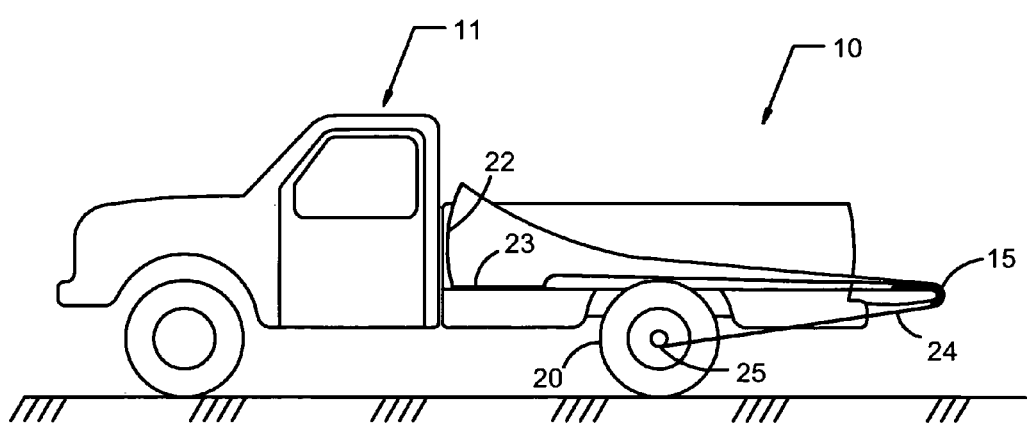
FIG. 10 is a partial cutaway, side elevation view of a pickup truck equipped with an alternative embodiment of a flexible member and friction-reducing member in accordance with the present invention.

FIG. 10 shows another alternative embodiment where a pulley 25 is attached to the hubs of the rear tire 20. The extension pieces 24 may be attached to the pulley 25. As the vehicle 11 moves forward or backward the extension pieces 24 may wind on the pulley pulling the load out. The ratio between the diameter of the pulley 25 and that of the tire 20 may determine how far the vehicle must travel to expel the entire load 12.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An assembly comprising:
    a vehicle comprising
        at least one wheel supporting at least a portion of the weight of the vehicle on a supporting surface, and
        a cargo area having a length, a width, a first end, a second end opposite the first end, and a tailgate defining the second end, the tailgate having a left side and a right side;
    a flexible member having a first portion extending to substantially completely cover the cargo area and a second portion connecting to the first portion proximate the second end to extend therefrom to pass around the second end of the cargo area to be captured between the at least one wheel and the supporting surface; and
    a friction-reducing member positioned proximate the second end to extend beyond the left side and the right side of the tailgate.

2. The assembly of claim 1, wherein the friction-reducing member is positioned between the rearwardmost edge of the tailgate, when in the open position, and the second portion of the flexible member.

3. The assembly of claim 2, wherein the friction-reducing member comprises a material selected from the group consisting of woods, metals, metal alloys, polymers, elastomers, and composites.

4. The assembly of claim 3, wherein the friction-reducing member comprises at least one roller.

5. A method comprising:
    providing a vehicle comprising at least one wheel supporting at least a portion of the weight of the vehicle, and a cargo area having a length, a width, a first end, and a second end opposite the first end comprising a tailgate selectively pivoting between a vertical, closed position and a horizontal, open position;
    providing a flexible member having a first portion, and a second portion extending therefrom to a distal edge;
    covering at least a portion of the cargo area with the first portion of the flexible member;
    depositing a load directly onto the first portion of the flexible member to be supported by the cargo area;
    moving the load and vehicle to a desired location;
    extending the second portion of the flexible member from the cargo area, around the tailgate in the horizontal, open position, to a location behind the at least one wheel;
    backing the vehicle over the distal edge to capture the second portion between the at least one wheel and a supporting surface therebelow; and
    continuing to back the vehicle until a length of the first portion passes under the second end and a desired amount of the load has been discharged from the cargo area.

6. The method of claim 5, further comprising providing a friction-reducing member having a length equal to at least the width of the cargo area.

7. The method of claim 6, further comprising positioning the friction-reducing member at the second end of the cargo area to reduce friction as the second portion of the flexible member slides around the second end of the cargo area during backing of the vehicle.

8. The method of claim 7, further comprising securing the second portion of the flexible material over the top of the load prior to moving the vehicle.

* * * * *